(12) United States Patent
Peng et al.

(10) Patent No.: US 12,177,872 B2
(45) Date of Patent: Dec. 24, 2024

(54) RESOURCE ALLOCATION METHOD AND DEVICE

(71) Applicant: VIVO MOBILE COMMUNICATION CO., LTD., Guangdong (CN)

(72) Inventors: Shuyan Peng, Guangdong (CN); Zichao Ji, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 734 days.

(21) Appl. No.: 17/377,572

(22) Filed: Jul. 16, 2021

(65) Prior Publication Data
US 2021/0345346 A1    Nov. 4, 2021

Related U.S. Application Data

(63) Continuation of application No. PCT/CN2020/072686, filed on Jan. 17, 2020.

(30) Foreign Application Priority Data

Jan. 18, 2019    (CN) .......................... 201910108398.3

(51) Int. Cl.
*H04W 72/04*    (2023.01)
*H04W 4/02*    (2018.01)
(Continued)

(52) U.S. Cl.
CPC ........... *H04W 72/53* (2023.01); *H04W 4/027* (2013.01); *H04W 72/0446* (2013.01);
(Continued)

(58) Field of Classification Search
CPC ............ H04W 72/02; H04W 72/0446; H04W 74/0808; H04W 72/542
See application file for complete search history.

(56) References Cited

U.S. PATENT DOCUMENTS

2016/0360541 A1    12/2016    Kim et al.
2019/0268915 A1    8/2019    Li et al.
(Continued)

FOREIGN PATENT DOCUMENTS

CN    106060947 A    10/2016
CN    106063152 A    10/2016
(Continued)

OTHER PUBLICATIONS

LG Electronics, "Discussion on resource allocation mechanism for NRV2X," 3GPP TSG RAN WG IMeeting#95,—1812844,Spokane, USA, Nov. 12-16, 2018. (Year: 2018).*
(Continued)

*Primary Examiner* — Romani Ohri
(74) *Attorney, Agent, or Firm* — Price Heneveld LLP (57) ABSTRACT

A resource allocation method and a device are provided. The method is applied to a terminal device in sidelink communication, and includes: determining a first numerical value of a first counter at a first occasion; in a case that the first numerical value is greater than a first preset value, determining an occupancy status of a first transmission resource associated with the first occasion, where the first preset value is an integer greater than or equal to 0; and selecting a target resource for information transmission based on the occupancy status of the first transmission resource.

14 Claims, 3 Drawing Sheets

Determine a first numerical value of a first counter at a first occasion — S110

In a case that the first numerical value is greater than a first preset value, determine an occupancy status of a corresponding first transmission resource at the first occasion, where the first preset value is an integer greater than or equal to 0 — S120

Select a target transmission resource for information transmission based on the occupancy status of the first transmission resource — S130

(51) Int. Cl.
   *H04W 72/0446* (2023.01)
   *H04W 72/0453* (2023.01)
   *H04W 72/51* (2023.01)
   *H04W 72/53* (2023.01)
   *H04W 72/54* (2023.01)
   *H04W 74/0808* (2024.01)
   *H04W 76/14* (2018.01)

(52) U.S. Cl.
   CPC ....... *H04W 72/0453* (2013.01); *H04W 72/51* (2023.01); *H04W 72/54* (2023.01); *H04W 74/0808* (2013.01); *H04W 76/14* (2018.02)

(56) References Cited

U.S. PATENT DOCUMENTS

| | | | |
|---|---|---|---|
| 2019/0289615 A1* | 9/2019 | Lee | H04W 36/06 |
| 2020/0296690 A1* | 9/2020 | Lee | H04W 4/40 |
| 2021/0289473 A1* | 9/2021 | Chae | H04W 72/12 |

FOREIGN PATENT DOCUMENTS

| | | |
|---|---|---|
| EP | 3499994 A1 | 8/2017 |
| EP | 3522629 A1 | 9/2017 |
| WO | 2016159712 A1 | 10/2016 |
| WO | 2018030854 A1 | 2/2018 |
| WO | 2018062857 A1 | 4/2018 |
| WO | 2018084094 A1 | 5/2018 |

OTHER PUBLICATIONS

LG Electronics, "Discussion on resource allocation mechanism for NR V2X," 3GPP TSG RAN WG1 Meeting #95, R1-1812844, Spokane, USA, Nov. 12-16, 2018.

VIVO, "Discussion on resource allocation mechanism for NR V2X", 3GPP TSG RAN WG1 Ad-Hoc Meeting 1901, R1-1900120, Taipei, Jan. 21-25, 2019.

* cited by examiner

RESOURCE ALLOCATION METHOD AND DEVICE

CROSS-REFERENCE TO RELATED APPLICATIONS

This disclosure is a continuation application of a PCT Application No. PCT/CN2020/072686 filed on Jan. 17, 2020, which claims priority to Chinese Patent Application No. 201910108398.3, filed in China on Jan. 18, 2019, the disclosures of which are incorporated herein by reference in their entireties.

TECHNICAL FIELD

This disclosure relates to the field of communications technologies, and in particular, to a resource allocation method and a device.

BACKGROUND

A sidelink refers to a link for direct communication between user equipment (UE) and UE without using a network. Long Term Evolution (LTE) Sidelink includes Device to Device (D2D) communication and Vehicle to Everything (V2X) communication. New radio (NR) Sidelink includes V2X communication. LTE Sidelink supports two resource allocation modes: scheduled resource allocation mode and UE autonomous resource selection mode. In the scheduled resource allocation mode, a network device configures resources for a sidelink. In the UE autonomous resource selection mode, UE may periodically reserve some resources based on monitoring results over a period of time, that is, the autonomous resource selection mode is a semi-static resource reservation mode.

The main consideration in LTE V2X communications systems is to support basic safety services, most of which are periodic services with a fixed packet size. The maximum end-to-end latency of data packets is 20 ms to 1000 ms, and their reliability is 96% to 99%. In the UE autonomous resource selection mode, a minimum resource reservation period selectable by the UE is 20 ms. However, in addition to periodic services, an NR V2X communications system also supports aperiodic services, and the aperiodic services usually have a minimum latency of less than 20 ms. Therefore, if the semi-static resource reservation mode is still employed, resource utilization will be reduced, and the resource collision rate will increase.

SUMMARY

An objective of embodiments of this disclosure is to provide a resource allocation method.

According to a first aspect, a resource allocation method is provided, applied to a terminal device in sidelink communication, where the method includes: determining a first numerical value of a first counter at a first occasion;
    in a case that the first numerical value is greater than a first preset value, determining an occupancy status of a first transmission resource associated with the first occasion, where the first preset value is an integer greater than or equal to 0; and
    selecting a target resource for information transmission based on the occupancy status of the first transmission resource.

According to a second aspect, a resource allocation method is provided, applied to a terminal device in sidelink communication, where the method includes:
    determining a target resource allocation mode at a current occasion, where the target resource allocation mode is one of the following modes: random resource allocation mode, dynamic resource allocation mode, and hybrid semi-static/dynamic resource allocation mode;
    determining a resource set corresponding to the target resource allocation mode; and
    allocating a resource based on the resource set and the target resource allocation mode.

According to a third aspect, a terminal device is provided, applied to sidelink communication, where the terminal device includes:
    a first processing module, configured to determine a first numerical value of a first counter at a first occasion;
    a second processing module, configured to determine, in a case that the first numerical value is greater than a first preset value, an occupancy status of a first transmission resource associated with the first occasion, where the first preset value is an integer greater than or equal to 0; and
    the second processing module is further configured to select a target resource for information transmission based on the occupancy status of the first transmission resource.

According to a fourth aspect, a terminal device is provided, applied to sidelink communication, where the terminal device includes:
    a first processing module, configured to determine a target resource allocation mode at a current occasion, where the target resource allocation mode is one of the following modes: random resource allocation mode, dynamic resource allocation mode, and hybrid semi-static/dynamic resource allocation mode;
    a second processing module, configured to determine a resource set corresponding to the target resource allocation mode; and
    a third processing module, configured to allocate a resource based on the resource set and the target resource allocation mode.

According to a fifth aspect, a terminal device is provided, applied to sidelink communication, where the terminal device includes: a memory, a processor, and a computer program stored in the memory and capable of running on the processor, and when the computer program is executed by the processor, the steps of the resource allocation method according to the first aspect are implemented.

According to a sixth aspect, a terminal device is provided, applied to sidelink communication, where the terminal device includes: a memory, a processor, and a computer program stored in the memory and capable of running on the processor, and when the computer program is executed by the processor, the steps of the resource allocation method according to the second aspect are implemented.

According to a seventh aspect, a computer-readable storage medium is provided, where the computer-readable storage medium stores a computer program, and when the computer program is executed by a processor, the steps of the method according to the first aspect are implemented.

According to an eighth aspect, a computer-readable storage medium is provided, where the computer-readable storage medium stores a computer program, and when the computer program is executed by a processor, the steps of the method according to the second aspect are implemented.

BRIEF DESCRIPTION OF DRAWINGS

The accompanying drawings described herein are intended for better understanding of this disclosure, and constitute a part of this disclosure. Example embodiments of this disclosure and descriptions thereof are intended to explain this disclosure and do not constitute any inappropriate limitation on this disclosure. In the drawings.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure shall fall within the protection scope of this disclosure.

The technical solutions of this disclosure can be applied to various communications systems, such as a long term evolution (LTE) sidelink system and a new radio (NR) sidelink system.

In the embodiments of this disclosure, a terminal device (UE), also referred to as a mobile terminal, a mobile user device, or the like, may communicate with one or more core networks through a radio access network (for example, RAN). The user equipment may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network.

In the embodiments of this disclosure, a network device is an apparatus deployed in a radio access network to provide radio communication functions for terminal devices. For example, the network device may be a base station, and the base station may be an evolved base station (eNB or e-NodeB, evolutional Node B) in LTE or a 5G base station (gNB).

In the embodiments of this disclosure, the terminal device may be a transmit-end terminal device (transmit UE) in sidelink communication, or may be a receive-end terminal device (receive UE) in sidelink communication.

The technical solutions provided in the embodiments of this disclosure are described in detail below with reference to the accompanying drawings.

Figure 1:
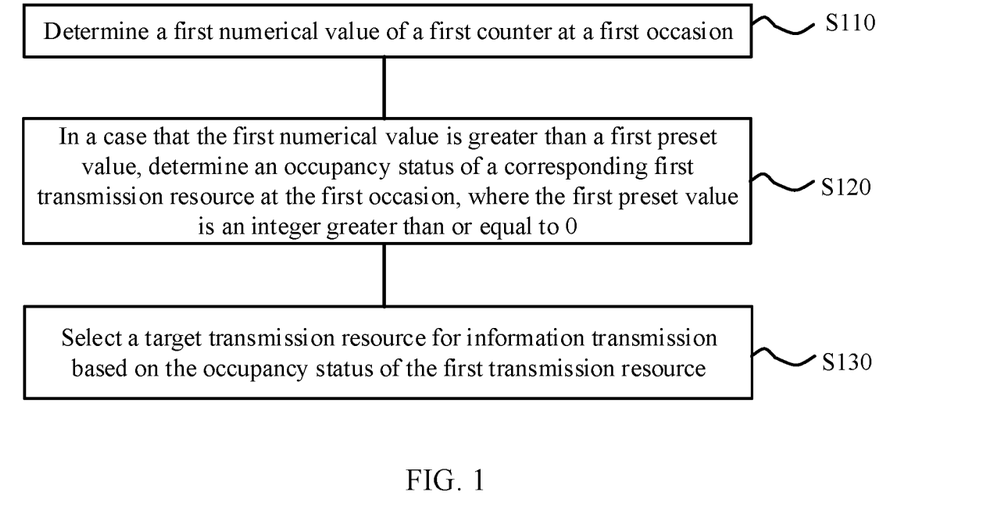
FIG. 1 is a schematic flowchart of a resource allocation method according to an embodiment of this disclosure.

FIG. 1 shows a resource allocation method according to an embodiment of this disclosure. The method shown in FIG. 1 is applied to a terminal device in sidelink communication. As shown in FIG. 1, the method includes the following steps.

S110: Determine a first numerical value of a first counter at a first occasion.

Optionally, in some embodiments, a first counter may be activated at a time of arrival of a data packet. Alternatively, when the terminal device is a transmit-end terminal device, the first counter is activated at a receiving occasion of higher layer signaling, downlink control information (DCI), or sidelink control information (SCI), or the first counter is activated at an occasion indicated by higher layer signaling, DCI, or SCI. Alternatively, when the terminal device is a receive-end terminal device, the first counter is activated at a receiving occasion of higher layer signaling, DCI, SCI, a scheduling request (SR), or a buffer status report (BSR), or the first counter is activated at an occasion indicated by higher layer signaling, DCI, SCI, SR or BSR. The higher layer signaling herein may be, for example, radio resource control (RRC) signaling, broadcast signaling, sidelink broadcast information, or sidelink system information.

S120: In a case that the first numerical value is greater than a first preset value, determine an occupancy status of a first transmission resource associated with the first occasion, where the first preset value is an integer greater than or equal to 0.

It should be noted that the first transmission resource associated with the first occasion is a time-frequency resource. The first preset value may be a value predefined by a protocol, or a value negotiated by two communication parties.

Optionally, in S120, the determining an occupancy status of a first transmission resource associated with the first occasion includes at least one of the following manners: determining an occupancy status of the first transmission resource based on a transmission resource indicated in scheduling assignment (SA) information, where the SA is used to schedule the first transmission resource; determining an occupancy status of the first transmission resource based on an interference measurement value and an interference threshold corresponding to the first transmission resource; determining an occupancy status of the first transmission resource based on a signal strength value and a signal strength threshold corresponding to the first transmission resource; determining an occupancy status of the first transmission resource based on an interference measurement value and an interference threshold corresponding to a transmission resource in which the SA is located; and determining an occupancy status of the first transmission resource based on a signal strength value and a signal strength threshold corresponding to a transmission resource in which the SA is located.

For example, if the first transmission resource is a resource indicated by the SA, it is considered that the first transmission resource is occupied. Alternatively, if an interference measurement value corresponding to the first transmission resource is higher than the interference threshold, it is considered that the first transmission resource is occupied. Alternatively, if a signal strength value corresponding to a transmission resource in which the SA is located is less than the signal strength threshold, it is considered that the first transmission resource is occupied.

Further, in the case of determining an occupancy status of the first transmission resource associated with the first occasion, the occupancy status of the first transmission resource associated with the first occasion is determined per a time domain detection granularity, where the time domain detection granularity is the same as or different from a time domain resource unit granularity.

For example, the time domain detection granularity may be one of millisecond ms, subframe, N slots, multi-slot, N symbols, and frame, where N is a positive integer greater than or equal to 1. For example, the time domain detection granularity is symbol, and the time domain resource unit granularity is slot.

The above time domain detection granularity may be configured in any one of the following manners: pre-configured by a network device, configured by a network device, configured by a terminal device, and pre-configured by a terminal device.

Optionally, in S120, in a case that the first numerical value is less than or equal to the first preset value, the first transmission resource is selected as the target resource.

S130: Select a target resource for information transmission based on the occupancy status of the first transmission resource.

Optionally, in some embodiments, in a case that the first transmission resource is not occupied, the first numerical value is adjusted to obtain a second numerical value, where the second numerical value is less than the first numerical value; and a target resource for information transmission is selected based on the second numerical value.

Optionally, adjusting the first numerical value to obtain a second numerical value includes: determining a difference between the first numerical value and M as the second numerical value, where M is a positive integer less than or equal to the number of frequency domain resource units included in the first transmission resource.

In other words, when the first numerical value is decreasing, only the time domain dimension may be considered, or the time domain dimension and frequency domain dimension may be considered. For example, if an interference measurement value corresponding to a transmission resource (3 symbols) in which the SA is located is greater than the interference threshold, the value of M is 1, that is, first numerical value−1=second numerical value, and that the value of M is 1 represents that the first numerical value decreases by slot. Further, if the frequency domain dimension is considered, and the number of frequency domain resource units included in the first transmission resource is 2, the value of M is 2.

Figure 2:
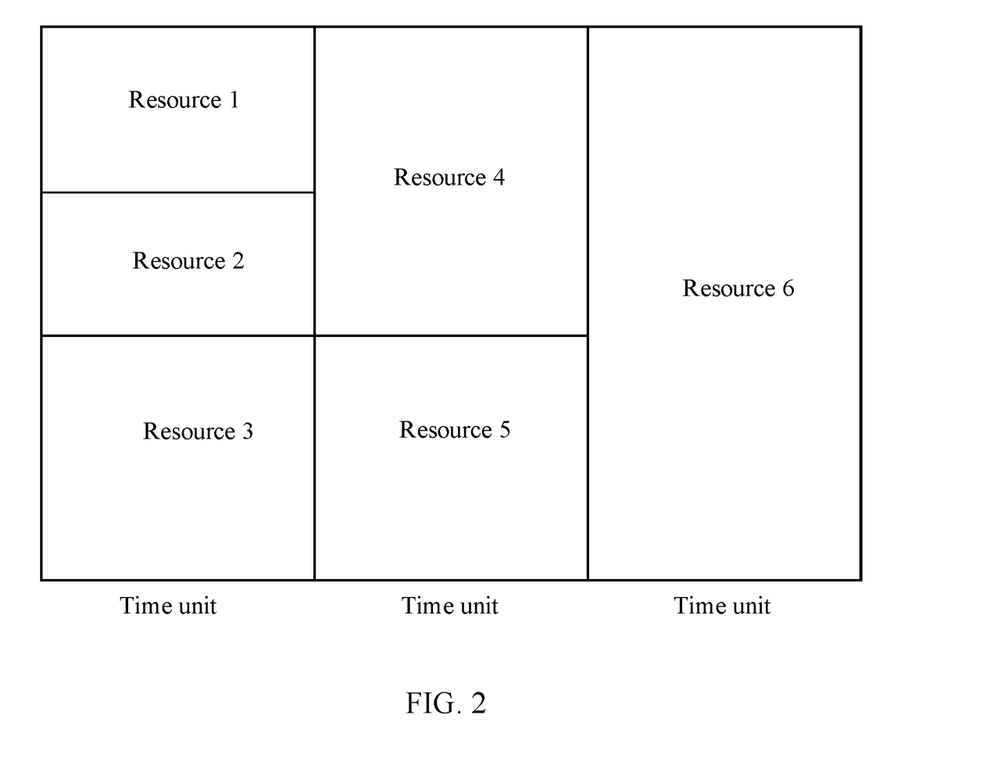
FIG. 2 is a schematic diagram of a resource allocation method according to a specific embodiment of this disclosure.

For example, as shown in FIG. 2, the resource pattern in FIG. 2 is configured in one of the following manners: pre-configured by a network device, pre-configured by a terminal device, configured by a network device, and configured by a terminal device. Within the first time unit (time domain resource unit granularity) in the resource pattern, there are three candidate resources: resource 1, resource 2, and resource 3. An occupancy status of each of the three candidate resources is determined sequentially, and the number of unoccupied resources is counted. If there are two unoccupied resources, the value of M is 2, that is, first numerical value−2=second numerical value.

The above time domain resource unit granularity is one of the following granularities: millisecond, subframe, N slots, multi-slot (slot aggregation), N symbols, frame, and time pattern (time-pattern), and the frequency domain resource unit granularity is one of the following granularities: F sub-channels (subchannel), F resource blocks (RB), F resource block groups (RBG), and frequency pattern, where N and F are positive integers greater than or equal to 1.

F may be a value predefined, or pre-configured, or configured by a network device, or configured by a terminal device, or F may be a value of a group of values predefined, or pre-configured, or configured by a network device, or configured by a terminal device.

In addition, the time domain resource unit granularity and/or the frequency domain resource granularity is predefined; alternatively, the time domain resource unit granularity and/or the frequency domain resource granularity is configured in any one of the following manners: pre-configured by a network device, configured by a network device, configured by a terminal device, and pre-configured by a terminal device.

Optionally, the selecting a target resource for information transmission based on the second numerical value includes: in a case that the second numerical value is less than or equal to the first numerical value, selecting the first available transmission resource that is after the first occasion in time domain as the target resource for information transmission, where the first available transmission resource that is after the first occasion in time domain is a resource that meets at least one of the following conditions: unoccupied, satisfying interference requirements, and satisfying a quality of service (QoS) demand; and in a case that the second numerical value is greater than the first preset value, selecting a target resource for information transmission based on an occupancy status of a second transmission resource associated with a second occasion, where a time gap between the second occasion and the first occasion is a target duration, and the target duration is any one of the following: a time domain resource unit granularity, a time domain detection granularity, a network-configured duration, and a terminal-configured duration.

Further, in a case that the first transmission resource is occupied, a target resource for information transmission is selected based on the occupancy status of the second transmission resource.

It may be understood that a specific implementation for the selecting a target resource for information transmission based on the occupancy status of the second transmission resource may be: if the second transmission resource is not occupied, adjusting the second numerical value obtain an adjusted second numerical value; if the adjusted second numerical value is less than or equal to the first preset value, selecting the first available transmission resource that is after the second occasion in time domain as the target resource for information transmission; and if the adjusted second numerical value is greater than the first preset value, selecting the target resource for information transmission based on an occupancy status of a transmission resource corresponding to an occasion apart from the second occasion by the time domain resource unit granularity. Herein, the method for selecting a target resource for information transmission based on an occupancy status of a transmission resource corresponding to an occasion apart from the second occasion by the time domain resource unit granularity is similar to the method for selecting a target resource for information transmission based on an occupancy status of a second transmission resource, and details are not described herein.

Again using FIG. 2 as an example, if the second numerical value obtained by subtracting 2 from the first numerical value within the first time unit is still greater than 0, a next time unit is selected. An occupancy status of each of resource 4 and resource 5 corresponding to the next time unit is determined sequentially, and the number of unoccupied resources is counted. If there is one unoccupied resource, the second numerical value continues to decrease by 1. If the second numerical value obtained by subtracting 2 from the first numerical value within the first time unit is less than 0, a next available transmission resource is selected as the target resource for information transmission.

In the embodiments of this disclosure, optionally, a location of an available frequency domain resource in the first available transmission resource that is after the first occasion in time domain is determined in one of the following manners: determined based on the second numerical value and the total number of sub-channels in the first available transmission resource that is after the first occasion in time domain; and determined based on an identifier of a terminal device or a geographical location of a terminal device.

In some embodiments, a location of an available frequency domain resource is related to a value of a first counter. For example, a location of an available frequency domain resource is determined by a remainder obtained from the value of the first counter mod the total number of sub-channels. In this way, different terminal devices may have different available frequency domain resources, reducing resource collision.

Optionally, the method shown in FIG. 1 further includes: transmitting first target information on the target resource, where the first target information includes one of the following information: control information and data information, control information, and initial transmission information.

Optionally, in some embodiments, in a case that the first target information includes control information, the method shown in FIG. 1 further includes:
  determining a third numerical value of a second counter at a third occasion; and
  in a case that the third numerical value is less than or equal to a second preset value, transmitting second target information on a corresponding third transmission resource at the third occasion or on the first available transmission resource that is after the third occasion in time domain, where the second target information includes data information and control information, or the second target information includes data information, and the second preset value is an integer greater than or equal to 0.

It should be noted that the third transmission resource associated with the third occasion is a time-frequency resource. The second preset value is a value predefined by a protocol, or a value negotiated by two communication parties.

Further, in a case that the third numerical value is greater than the second preset value, an occupancy status of the third transmission resource is determined; in a case that the third transmission resource is not occupied, the third numerical value is adjusted to obtain a fourth numerical value, where the fourth numerical value is less than the third numerical value; in a case that the fourth numerical value is less than or equal to a second preset value, the second target information is transmitted on the first available transmission resource that is after the third occasion in time domain; and in a case that the fourth numerical value is greater than the second preset value, a resource for transmitting the second target information is selected based on an occupancy status of a fourth transmission resource associated with a fourth occasion, where a time gap between the fourth occasion and the third occasion is the time domain resource unit granularity.

The location of an available frequency domain resource in the first available transmission resource that is after the third occasion in time domain may be determined based on the third numerical value and the total number of sub-channels in the first available transmission resource that is after the third occasion in time domain. For example, a location of an available frequency domain resource is determined by a remainder obtained from the value of the second counter mod the total number of sub-channels. In this way, different terminal devices may have different available frequency domain resources, reducing resource collision.

It should be noted that the method for determining an occupancy status of a third transmission resource is the same as the method for determining an occupancy status of a first transmission resource. To avoid repetition, details are not described herein again. Also, the method for selecting a resource for transmitting the second target information based on an occupancy status of a fourth transmission resource associated with a fourth occasion is the same as the method for selecting a target resource for information transmission based on an occupancy status of a second transmission resource. To avoid repetition, details are not described herein again.

The second counter and first counter may be activated in one of the following manners:
  both are activated simultaneously at a first target occasion;
  the first counter is activated at the first target occasion, and the second counter is activated when a value of the first counter is less than or equal to the first preset value; and
  the first counter is activated at the first target occasion, and the second counter is activated when a terminal device transmits the second target information on the target resource; where
  the first target occasion is earlier than the first occasion and the third occasion, and the first target occasion is one of the following occasions: time of arrival of a data packet, a receiving occasion of third target information, and an occasion indicated by the third target information;
  when the terminal device is a transmit-end terminal device, the third target information includes at least one of the following information: higher layer signaling, downlink control information DCI, and sidelink control information SCI; and
  when the terminal device is a receive-end terminal device, the third target information includes at least one of the following information: higher layer signaling, DCI, a scheduling request SR, a buffer status report BSR, and SCI.

The higher layer signaling herein may be, for example, radio resource control (RRC) signaling or broadcast signaling.

Optionally, in some embodiments, in a case that the first counter and the second counter are simultaneously activated at the first target occasion, an initial value of the second counter is greater than or equal to an initial value of the first counter. It may be considered that the first counter and the second counter herein are independently defined. In this case, even if the initial value of the second counter is greater than or equal to the initial value of the first counter, it may happen that the value of the second counter reaches 0 first, because decreasing conditions of the two counters are different and corresponding transmission resources are different.

Optionally, in some embodiments, the first counter and the second counter are simultaneously activated at the first target occasion, and in a case that an occasion at which the fourth numerical value is less than or equal to the second preset value is earlier than an occasion at which the second numerical value is less than or equal to the first preset value, the first available transmission resource that is after the third occasion in time domain is the same as the first available transmission resource that is after the first occasion in time domain, or the first available transmission resource that is after the third occasion in time domain is an available transmission resource next to the first available transmission resource that is after the first occasion in time domain.

In other words, at any occasion, when the value of the second counter is less than or equal to 0 and the value of the first counter is greater than 0, the resource selected based on the value of the second counter is the resource selected based on the value of the first counter, or an available transmission resource next to the resource selected based on the value of the first counter. For example, in a case that the second counter is a data counter, the Data-Counter reaches 0 at occasion t−t1, and the first counter is less than or equal to 0 at occasion t, control information is transmitted on a transmission resource associated with t+N, and data information is transmitted on the transmission resource associated with t+N. The transmission resource associated with t+N herein is a next available transmission resource that is after t in time domain.

In a specific example, a method for selecting a resource may include the following steps.

Step 1: Pre-configure a time domain resource unit granularity as one slot.

Step 2: Upon arrival of a data packet, initialize a value of a first counter, and predefine a value of a second counter.

Step 3: In a case that the value of the first counter is initialized to 0, transmit information on a current slot.

Step 4: In a case that the value of the first counter is greater than 0, determine whether a transmission resource associated with a current occasion is occupied; or in a case that the value of the first counter is less than or equal to 0, transmit control information on a next available slot.

In step 4, the method for determining whether a transmission resource associated with a current occasion is occupied is the same as the method for determining whether a first transmission resource is occupied shown in FIG. 1, and details are not described herein again.

Step 5: In a case that the transmission resource associated with the current occasion is not occupied, decrease the value of the first counter by 1, move to a next slot, and perform step 4 and its subsequent steps; or, in a case that the transmission resource associated with the current occasion is occupied, move to a next slot, and perform step 4 and its subsequent steps.

Step 6: In a case that the value of the second counter is 0, transmit data information on a next available slot.

Step 7: In a case that the value of the second counter is greater than 0, determine whether a transmission resource associated with the current occasion is occupied; or in a case that the value of the second counter is less than or equal to 0, transmit data information on a next available slot.

In step 7, the method for determining whether a transmission resource associated with a current occasion is occupied is the same as that in step 4, and details are not described herein again.

Step 8: In a case that the transmission resource associated with the current occasion is not occupied, decrease the value of the second counter by K, and move to a next slot to perform step 7 and subsequent steps; or, in a case that the transmission resource associated with the current occasion is occupied, and move to a next slot to perform step 7 and subsequent steps.

K in step 8 is a positive integer, K may be the same as or different from that in the method embodiment described in FIG. 1, and K may be the same as or different from N in the method shown in FIG. 1.

It should be noted that the above steps 1 to 8 do not limit the method steps, and the sequence of the above steps is specifically determined by the logical relationship between the steps.

It may be understood that in the specific embodiment, a resource for transmitting control information can be selected based on the first counter, a resource for data transmission is selected based on the second counter, and cross-slot scheduling may be implemented.

Optionally, in some embodiments, in a case that the first target information includes initial transmission information, the method shown in FIG. 1 further includes:

determining a fifth numerical value of a third counter at a fifth occasion;

in a case that the fifth numerical value is greater than a third preset value, determining an occupancy status of a fifth transmission resource associated with the fifth occasion, where the third preset value is an integer greater than or equal to 0;

in a case that the fifth transmission resource is not occupied, adjusting the fifth numerical value to obtain a sixth numerical value, where the sixth numerical value is less than the fifth numerical value;

in a case that the sixth numerical value is less than or equal to the third preset value, transmitting retransmission information of the initial transmission information on the first available transmission resource that is after the fifth occasion in time domain; and in a case that the sixth numerical value is greater than the third preset value, selecting a resource for transmitting the retransmission information of the initial transmission information based on an occupancy status of a sixth transmission resource associated with a sixth occasion, where a time gap between the sixth occasion and the fifth occasion is the time domain resource unit granularity.

It should be noted that the fifth transmission resource associated with the fifth occasion and the transmission resource associated with the sixth occasion are time-frequency resources. The third preset value is a value predefined by a protocol, or a value negotiated by two communication parties.

The location of an available frequency domain resource in the first available transmission resource that is after the fifth occasion in time domain may be determined based on the fifth numerical value and the total number of sub-channels in the first available transmission resource that is after the fifth occasion in time domain. For example, a location of an available frequency domain resource is determined by a remainder obtained from the value of the third counter mod the total number of sub-channels. In this way, different terminal devices may have different available frequency domain resources, reducing resource collision.

It should be noted that the method for determining an occupancy status of a fifth transmission resource associated with a fifth occasion, and the method for determining an occupancy status of a sixth transmission resource associated with a sixth occasion are the same as the above-described method for determining an occupancy status of a first transmission resource. Also, the method for selecting a resource for transmitting the retransmission information of the initial transmission information based on an occupancy status of a sixth transmission resource associated with a sixth occasion is similar to the above-described method for selecting a target resource for information transmission based on an occupancy status of a second transmission resource. To avoid repetition, details are not described herein again.

The foregoing third counter and first counter may be activated in one of the following manners:
- both are activated simultaneously at a second target occasion;
- the first counter is activated at the second target occasion, and the third counter is activated when a value of the first counter is less than or equal to the first preset value; and
- the first counter is activated at the first target occasion, and the third counter is activated when a terminal device transmits the initial transmission information on the target resource; where
- the second target occasion is earlier than the first occasion and the fifth occasion, and the second target occasion is one of the following occasions: time of arrival of a data packet, a receiving occasion of fourth target information, and an occasion indicated by the fourth target information;
- when the terminal device is a transmit-end terminal device, the fourth target information includes at least one of the following information: higher layer signaling, downlink control information DCI, and sidelink control information SCI; and
- when the terminal device is a receive-end terminal device, the fourth target information includes at least one of the following information: higher layer signaling, DCI, a scheduling request SR, a buffer status report BSR, and SCI.

Optionally, in some embodiments, the first counter and the third counter are simultaneously activated at the first target occasion, and an initial value of the third counter is greater than or equal to an initial value of the first counter. It may be considered that the first counter and the third counter herein are independently defined. In this case, even if the initial value of the third counter is greater than or equal to the initial value of the first counter, it may happen that the value of the third counter reaches 0 first, because decreasing conditions of the two counters are different, or corresponding transmission resources are different.

Optionally, in some embodiments, the first counter and the third counter are simultaneously activated at the first target occasion, and in a case that an occasion at which the sixth numerical value is less than or equal to the third preset value is earlier than an occasion at which the second numerical value is less than or equal to the first preset value, the first available transmission resource that is after the fourth occasion in time domain is the same as the first available transmission resource that is after the first occasion in time domain, or the first available transmission resource that is after the fourth occasion in time domain is an available transmission resource next to the first available transmission resource that is after the first occasion in time domain.

In other words, at any occasion, when the value of the third counter is less than or equal to 0 and the value of the first counter is greater than 0, the resource selected based on the value of the third counter is the resource selected based on the value of the first counter, or an available transmission resource next to the resource selected based on the value of the first counter. For example, in a case that the second counter is a retransmission counter (ReTX-Counter), the ReTX-Counter reaches 0 at occasion t–t1, and the first counter is less than or equal to 0 at occasion t, control information is transmitted on a transmission resource associated with t+N, and data information is transmitted on a transmission resource associated with t+2*N. The transmission resource associated with t+N herein is a next available transmission resource that is after t in time domain, and the transmission resource associated with t+2*N is a transmission resource next to the transmission resource associated with t+N.

In a specific example, a method for selecting a resource may include the following steps.
- Step 1: Pre-configure a time domain resource unit granularity as one slot.
- Step 2: Upon arrival of a data packet, initialize a value of a first counter, and predefine a value of a third counter.
- Step 3: In a case that the value of the first counter is initialized to 0, transmit information on a current slot.
- Step 4: In a case that the value of the first counter is greater than 0, determine whether a transmission resource associated with a current occasion is occupied; or, in a case that the value of the first counter is less than or equal to 0, transmit initial transmission information on a next available slot.

In step 4, the method for determining whether a transmission resource associated with a current occasion is occupied is the same as the method for determining whether a first transmission resource is occupied shown in FIG. 1, and details are not described herein again.

- Step 5: In a case that the transmission resource associated with the current occasion is not occupied, decrease the value of the first counter by 1, and move to a next slot to perform step 4 and subsequent steps; or, in a case that the transmission resource associated with the current occasion is occupied, and move to a next slot to perform step 4 and subsequent steps.
- Step 6: In a case that the value of the second counter is greater than 0, determine whether a transmission resource associated with a current occasion is occupied; or in a case that the value of the second counter is less than or equal to 0, transmit retransmission information of initial transmission information on a next available slot.

In step 6, the method for determining whether a transmission resource associated with a current occasion is occupied is the same as that in step 4, and details are not described herein again.

- Step 7: In a case that the transmission resource associated with the current occasion is not occupied, decrease the value of the third counter by 1, move to a next slot, and perform step 6 and its subsequent steps; or, in a case that the transmission resource associated with the current occasion is occupied, move to a next slot, and perform step 6 and its subsequent steps.

It should be noted that the above steps 1 to 7 do not limit the method steps, and the sequence of the above steps is specifically determined by the logical relationship between the steps.

It may be understood that in the specific embodiment, a resource for transmitting initial transmission information can be selected based on the first counter, and a resource for transmitting retransmission information is selected based on the third counter.

In the related art, only two resource allocation modes are supported in LTE sidelink communications systems: scheduled resource allocation mode and UE autonomous resource selection mode, where the UE autonomous resource selection mode is a semi-static resource allocation mode. In addition to periodic services, the NR sidelink communications systems also support aperiodic services, and the aperiodic services usually have relatively small minimum latencies. Therefore, if the semi-static resource allocation mode is still employed in the LTE sidelink communications systems, resource utilization will decrease, and the resource collision rate will increase. To resolve the problem, this disclosure provides the following embodiment.

Figure 3:
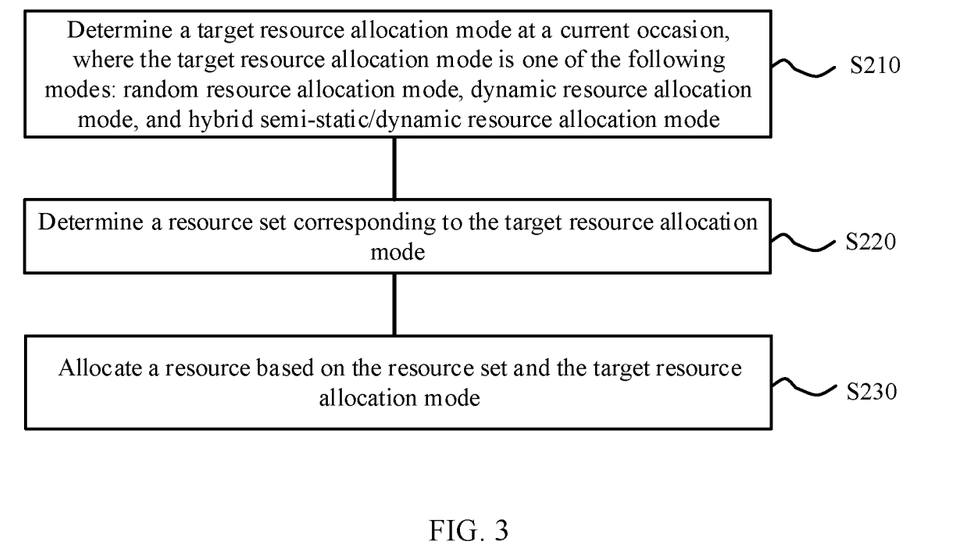
FIG. 3 is a schematic flowchart of a resource allocation method according to another embodiment of this disclosure.

FIG. 3 shows a resource allocation method according to another embodiment of this disclosure, applied to a terminal device in sidelink communication. The method shown in FIG. 3 includes the following steps.

S210: Determine a target resource allocation mode at a current occasion, where the target resource allocation mode is one of the following modes: random resource allocation mode, dynamic resource allocation mode, and hybrid semi-static/dynamic resource allocation mode.

In some embodiments, the dynamic resource allocation mode may be the resource allocation mode shown in FIG. 1.

Optionally, in S210, the determining a target resource allocation mode at a current occasion includes: determining the target resource allocation mode based on target information, where the target information is at least one of the following information: a data packet size, a data packet transmission rate, a velocity of a terminal device, a density of terminal devices corresponding to a preset zone, an identifier of a zone at which a terminal device is located (Zone ID), numerology, a resource allocation mode, and network coverage indication information (in coverage/out of coverage).

In an example, the target information includes a data packet size, where when the data packet size is less than a preset size, the target resource allocation mode is the random resource allocation mode; and when the data packet size is greater than or equal to the preset size, the target resource allocation mode is the dynamic resource allocation mode or the hybrid semi-static/dynamic resource allocation mode.

In another example, the target information includes a velocity of a terminal device. In this case, the determining a target resource allocation mode at a current occasion includes: determining the target resource allocation mode based on the velocity of the terminal device, and a correspondence between velocities and resource allocation modes. The correspondence herein may be predefined or pre-configured.

For example, in a case that the velocity of the terminal device is greater than a preset velocity, the dynamic resource allocation mode is selected. In a case that the velocity of the terminal device is less than or equal to a preset velocity, the hybrid semi-static/dynamic resource allocation mode is selected.

In still another example, the target information includes network coverage indication information, where when the network coverage indication information indicates that the terminal device is out of network coverage, the target resource allocation mode is the hybrid semi-static/dynamic resource allocation mode; and when the network coverage indication information indicates that the terminal device is in network coverage, the target resource allocation mode is the dynamic resource allocation mode.

In a further example, when a normal cyclic prefix (NCP) is used, the hybrid semi-static/dynamic resource allocation mode is used. When an extended cyclic prefix (ECP) is used, the dynamic resource allocation mode is used.

S220: Determine a resource set corresponding to the target resource allocation mode.

Optionally, in some embodiments, when the target resource allocation mode is the dynamic resource allocation mode, and a resource allocation mode before the current occasion is the hybrid semi-static/dynamic resource allocation mode, the resource set includes all resources for sidelink communication.

When the target resource allocation mode is the hybrid semi-static/dynamic resource allocation mode, and a resource allocation mode before the current occasion is the dynamic resource allocation mode, the resource set includes all resources for sidelink communication except resources reserved for the dynamic resource allocation mode.

S230: Allocate a resource based on the resource set and the target resource allocation mode.

The resource allocation method according to the embodiments of this disclosure is described above in detail with reference to FIG. 1 to FIG. 3, and a terminal device according to an embodiment of this disclosure is described below in detail with reference to FIG. 4.

Figure 4:
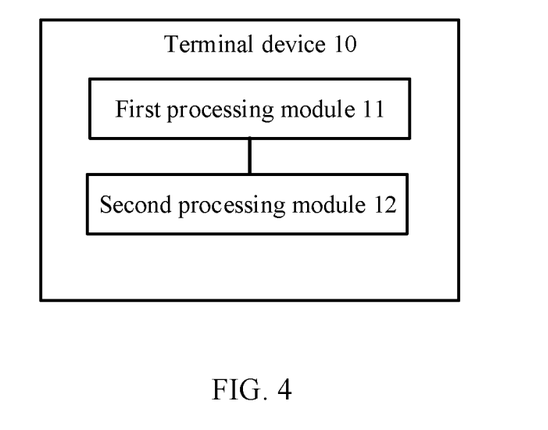
FIG. 4 is a schematic structural diagram of a terminal device according to an embodiment of this disclosure.

FIG. 4 is a schematic structural diagram of a terminal device according to an embodiment of this disclosure. The terminal device shown in FIG. 4 is applied to sidelink communication. The terminal device 10 shown in FIG. 4 includes:

a first processing module 11, configured to determine a first numerical value of a first counter at a first occasion; and a second processing module 12, configured to determine, in a case that the first numerical value is greater than a first preset value, an occupancy status of a first transmission resource associated with the first occasion, where the first preset value is an integer greater than or equal to 0; and the second processing module 12 is further configured to select a target resource for information transmission based on the occupancy status of the first transmission resource.

Optionally, in an embodiment, the second processing module 12 is further configured to:

in a case that the first numerical value is less than or equal to the first preset value, select the first transmission resource as the target resource.

Optionally, in an embodiment, the second processing module 12 is specifically configured to:

in a case that the first transmission resource is not occupied, adjust the first numerical value to obtain a second numerical value, where the second numerical value is less than the first numerical value; and select the target resource for information transmission based on the second numerical value.

Optionally, in an embodiment, the second processing module 12 is specifically configured to:

in a case that the second numerical value is less than or equal to the first preset value, select the first available transmission resource that is after the first occasion in time domain as the target resource for information transmission, where the first available transmission resource that is after the first occasion in time domain is a resource that meets at least one of the following conditions: unoccupied, satisfying interference requirements, and satisfying a quality of service QoS demand; and in a case that the second numerical value is greater than the first preset value, select the target resource for information transmission based on an occupancy status of a second transmission resource associated with a second occasion, where a time gap between the second occasion and the first occasion is a target duration, and the target duration is any one of the following: a time domain resource unit granularity, a time domain detection granularity, a network-configured duration, and a terminal-configured duration.

Optionally, in an embodiment, the second processing module 12 is further configured to:

in a case that the first transmission resource is occupied, select the target resource for information transmission based on the occupancy status of the second transmission resource.

Optionally, in an embodiment, the second processing module 12 is specifically configured to:

determine a difference between the first numerical value and M as the second numerical value, where M is a positive integer less than or equal to the number of frequency domain resource units included in the first transmission resource.

Optionally, in an embodiment, the second processing module 12 determines an occupancy status of a first transmission resource associated with the first occasion in at least one of the following manners:

determining the occupancy status of the first transmission resource based on a transmission resource indicated by scheduling assignment SA information, where the SA is used to schedule the first transmission resource;

determining the occupancy status of the first transmission resource based on an interference measurement value and an interference threshold corresponding to the first transmission resource;

determining the occupancy status of the first transmission resource based on a signal strength value and a signal strength threshold corresponding to the first transmission resource;

determining the occupancy status of the first transmission resource based on an interference measurement value and an interference threshold corresponding to a transmission resource in which the SA is located; and determining the occupancy status of the first transmission resource based on a signal strength value and a signal strength threshold corresponding to a transmission resource in which the SA is located.

Optionally, in an embodiment, the second processing module 12 is specifically configured to:

determine the occupancy status of the first transmission resource associated with the first occasion per the time domain detection granularity, where the time domain detection granularity is the same as or different from the time domain resource unit granularity.

Optionally, in an embodiment, the time domain resource unit granularity or the time domain detection granularity is one of the following granularities: millisecond, subframe, N slots, multi-slot, N symbols, frame, and time pattern, and a frequency domain resource unit granularity is one of the following granularities: F sub-channels, F resource blocks RBs, F resource block groups RBGs, and frequency pattern, where N and F are positive integers greater than or equal to 1.

optionally, in an embodiment, at least one of the time domain resource unit granularity, the frequency domain resource granularity, and the time domain detection granularity is predefined; or at least one of the time domain resource unit granularity, the frequency domain resource granularity, and the time domain detection granularity is configured in any one of the following manners: pre-configured by a network device, configured by a network device, configured by a terminal device, and pre-configured by a terminal device.

Optionally, in an embodiment, a location of an available frequency domain resource in the first available transmission resource that is after the first occasion in time domain is determined in one of the following manners:

determined based on the second numerical value and the total number of sub-channels in the first available transmission resource that is after the first occasion in time domain; and determined based on an identifier of a terminal device or a geographical location of a terminal device.

Optionally, in an embodiment, the terminal device 10 further includes a transceiver module, configured to transmit first target information on the target resource, where the first target information includes one of the following information: control information and data information, control information, and initial transmission information.

Optionally, in an embodiment, the first target information includes control information, and the first processing module 11 is further configured to:

determine a third numerical value of a second counter at a third occasion; and in a case that the third numerical value is less than or equal to a second preset value, transmit second target information on a third transmission resource associated with the third occasion or on the first available transmission resource that is after the third occasion in time domain, where the second target information includes data information and control information, or the second target information includes data information, and the second preset value is an integer greater than or equal to 0.

Optionally, in an embodiment, the first processing module 11 is further configured to:

in a case that the third numerical value is greater than the second preset value, determine an occupancy status of the third transmission resource;

in a case that the third transmission resource is not occupied, adjust the third numerical value to obtain a fourth numerical value, where the fourth numerical value is less than the third numerical value;

in a case that the fourth numerical value is less than or equal to the second preset value, transmit the second target information on the first available transmission resource that is after the third occasion in time domain; and in a case that the fourth numerical value is greater than the second preset value, select a resource for transmitting the second target information based on an occupancy status of a fourth transmission resource associated with a fourth occasion, where a time gap between the fourth occasion and the third occasion is the time domain resource unit granularity.

Optionally, in an embodiment, the first target information includes initial transmission information, and the first processing module 11 is further configured to:

determine a fifth numerical value of a third counter at a fifth occasion;

in a case that the fifth numerical value is greater than a third preset value, determine an occupancy status of a fifth transmission resource associated with the fifth occasion, where the third preset value is an integer greater than or equal to 0;

in a case that the fifth transmission resource is not occupied, adjust the fifth numerical value to obtain a sixth numerical value, where the sixth numerical value is less than the fifth numerical value;

in a case that the sixth numerical value is less than or equal to the third preset value, transmit retransmission information of the initial transmission information on the first available transmission resource that is after the fifth occasion in time domain; and in a case that the sixth numerical value is greater than the third preset value, select a resource for transmitting the retransmission information of the initial transmission information based on an occupancy status of a sixth transmission resource associated with a sixth occasion, where a time gap between the sixth occasion and the fifth occasion is the time domain resource unit granularity.

Optionally, in an embodiment, the first counter and the second counter are activated in one of the following manners:

both are activated simultaneously at a first target occasion;

the first counter is activated at the first target occasion, and the second counter is activated when a value of the first counter is less than or equal to the first preset value; and the first counter is activated at the first target occasion, and the second counter is activated when a terminal device transmits the second target information on the target resource; where the first target occasion is earlier than the first occasion and the third occasion, and the first target occasion is one of the following occasions: time of arrival of a data packet, a receiving occasion of third target information, and an occasion indicated by the third target information;

when the terminal device is a transmit-end terminal device, the third target information includes at least one of the following information: higher layer signaling, downlink control information DCI, and sidelink control information SCI; and when the terminal device is a receive-end terminal device, the third target information includes at least one of the following information: higher layer signaling, DCI, a scheduling request SR, a buffer status report BSR, and SCI.

Optionally, in an embodiment, the first counter and the second counter are simultaneously activated at the first target occasion, and an initial value of the second counter is greater than or equal to an initial value of the first counter.

Optionally, in an embodiment, the first counter and the second counter are simultaneously activated at the first target occasion, and in a case that an occasion at which the fourth numerical value is less than or equal to the second preset value is earlier than an occasion at which the second numerical value is less than or equal to the first preset value, the first available transmission resource that is after the third occasion in time domain is the same as the first available transmission resource that is after the first occasion in time domain, or the first available transmission resource that is after the third occasion in time domain is an available transmission resource next to the first available transmission resource that is after the first occasion in time domain.

Optionally, in an embodiment, the first counter and the third counter are activated in one of the following manners:

both are activated simultaneously at a second target occasion;

the first counter is activated at the second target occasion, and the third counter is activated when a value of the first counter is less than or equal to the first preset value; and the first counter is activated at the first target occasion, and the third counter is activated when a terminal device transmits the initial transmission information on the target resource; where the second target occasion is earlier than the first occasion and the fifth occasion, and the second target occasion is one of the following occasions: time of arrival of a data packet, a receiving occasion of fourth target information, and an occasion indicated by the fourth target information;

when the terminal device is a transmit-end terminal device, the fourth target information includes at least one of the following information: higher layer signaling, downlink control information DCI, and sidelink control information SCI; and when the terminal device is a receive-end terminal device, the fourth target information includes at least one of the following information: higher layer signaling, DCI, a scheduling request SR, a buffer status report BSR, and SCI.

Optionally, in an embodiment, the first counter and the third counter are simultaneously activated at the first target occasion, and an initial value of the third counter is greater than or equal to an initial value of the first counter.

Optionally, in an embodiment, the first counter and the third counter are simultaneously activated at the first target occasion, and in a case that an occasion at which the sixth numerical value is less than or equal to the third preset value is earlier than an occasion at which the second numerical value is less than or equal to the first preset value, the first available transmission resource that is after the fourth occasion in time domain is the same as the first available transmission resource that is after the first occasion in time domain, or the first available transmission resource that is after the fourth occasion in time domain is an available transmission resource next to the first available transmission resource that is after the first occasion in time domain.

The terminal device provided in this embodiment of this disclosure is capable of implementing processes that are implemented by the terminal device in the method embodiment of FIG. 1. To avoid repetition, details are not described herein again.

Figure 5:
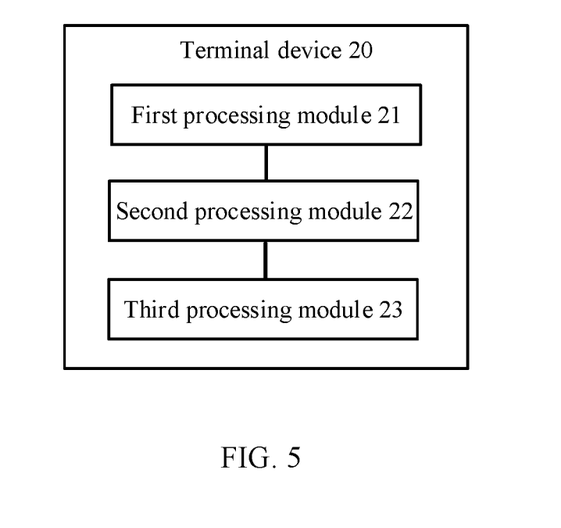
FIG. 5 is a schematic structural diagram of a terminal device according to another embodiment of this disclosure.

FIG. 5 is a schematic structural diagram of a terminal device according to another embodiment of this disclosure. The terminal device shown in FIG. 5 is applied to sidelink communication. The terminal device 20 shown in FIG. 5 includes:

a first processing module 21, configured to determine a target resource allocation mode at a current occasion, where the target resource allocation mode is one of the following modes: random resource allocation mode, dynamic resource allocation mode, and hybrid semi-static/dynamic resource allocation mode;

a second processing module 22, configured to determine a resource set corresponding to the target resource allocation mode; and a third processing module 23, configured to allocate a resource based on the resource set and the target resource allocation mode.

Optionally, in an embodiment, the first processing module 21 is further configured to:

determine the target resource allocation mode based on target information, where the target information is at least one of the following information: a data packet size, a data packet transmission rate, a velocity of a terminal device, a density of terminal devices corresponding to a preset zone, an identifier of a zone at which a terminal device is located, a numerology, a resource allocation mode, and network coverage indication information.

Optionally, in an embodiment, the target information includes a data packet size, where
when the data packet size is less than a preset size, the target resource allocation mode is the random resource allocation mode; and when the data packet size is greater than or equal to the preset size, the target resource allocation mode is the dynamic resource allocation mode or the hybrid semi-static/dynamic resource allocation mode.

Optionally, in an embodiment, the target information includes a velocity of the terminal device, where
the first processing module 21 is configured to determine the target resource allocation mode based on the velocity of the terminal device, and a correspondence between velocities and resource allocation modes.

Optionally, in an embodiment, the target information includes network coverage indication information, where
when the network coverage indication information indicates that the terminal device is out of network coverage, the target resource allocation mode is the hybrid semi-static/dynamic resource allocation mode; and when the network coverage indication information indicates that the terminal device is in network coverage, the target resource allocation mode is the dynamic resource allocation mode.

Optionally, in an embodiment, when the target resource allocation mode is the dynamic resource allocation mode, and a resource allocation mode before the current occasion is the hybrid semi-static/dynamic resource allocation mode, the resource set includes all resources for sidelink communication; and
when the target resource allocation mode is the hybrid semi-static/dynamic resource allocation mode, and a resource allocation mode before the current occasion is the dynamic resource allocation mode, the resource set includes all resources for sidelink communication except resources reserved for the dynamic resource allocation mode.

The terminal device provided in this embodiment of this disclosure is capable of implementing processes that are implemented by the terminal device in the method embodiment of FIG. 3. To avoid repetition, details are not described herein again.

Figure 6:
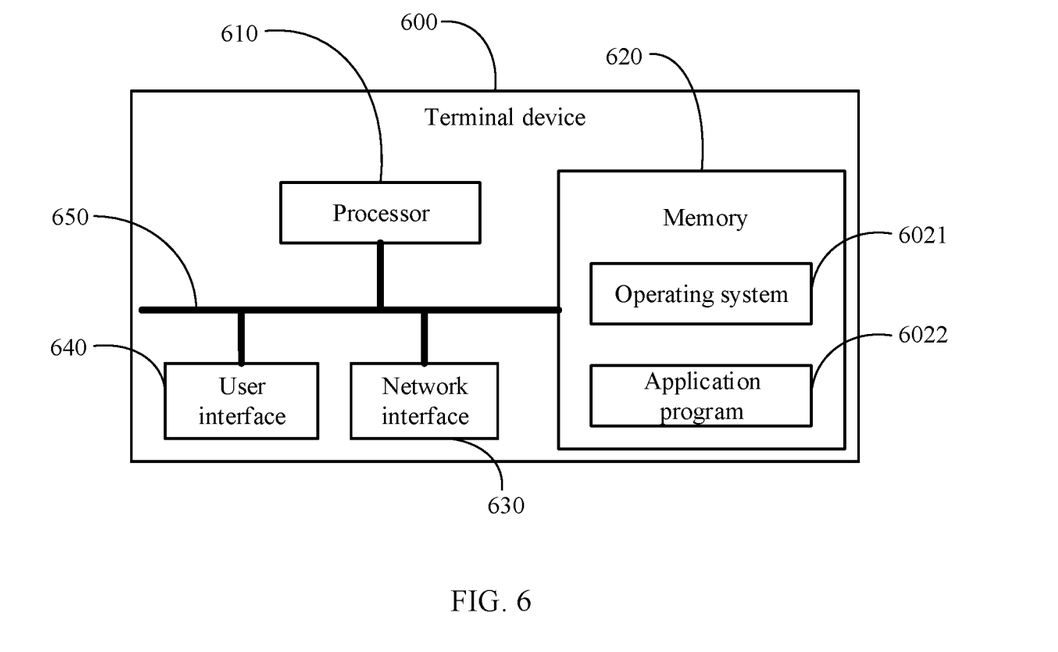
FIG. 6 is a schematic structural diagram of a terminal device according to still another embodiment of this disclosure.

FIG. 6 is a block diagram of a terminal device according to another embodiment of this disclosure. The terminal device 600 shown in FIG. 6 includes at least one processor 610, a memory 620, a user interface 630, and at least one network interface 640. The components in the terminal device 600 are coupled together through a bus system 650. It can be understood that the bus system 650 is configured to implement connection and communication between these components. In addition to a data bus, the bus system 650 further includes a power bus, a control bus, and a status signal bus. However, for clarity of description, various buses are marked as the bus system 650 in FIG. 5.

The user interface 630 may include a display, a keyboard, or a pointing device (for example, a mouse, a trackball (trackball), a touch panel, or a touchscreen).

It can be understood that the memory 620 in this embodiment of this disclosure may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. By way of example but not restrictive description, many forms of RAM may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DRRAM). The memory 620 of the system and the method described in the embodiments of this disclosure is intended to include but not limited to these and any other applicable types of memories.

In some implementations, the memory 620 stores the following elements: an executable module or a data structure, or a subset thereof, or an extended set thereof: an operating system 6021 and an application program 6022.

The operating system 6021 includes various system programs, such as a framework layer, a core library layer, and a driver layer, for implementing various basic services and processing hardware-based tasks. The application program 6022 includes various application programs, such as a media player and a browser, which are used to implement various application services. A program for implementing the method in the embodiments of this disclosure may be included in the application program 6022.

In this embodiment of this disclosure, the terminal device 600 further includes: a computer program stored in the memory 620 and capable of running on the processor 610. When the computer program is executed by the processor 610, the processes of the methods described above with reference to FIG. 1 and FIG. 3 are implemented, with the same technical effects achieved. To avoid repetition, details are not described herein again.

The method disclosed in the foregoing embodiments of this disclosure may be applied to the processor 610 or implemented by the processor 610. The processor 610 may be an integrated circuit chip, having a signal processing capability. During implementation, the steps of the foregoing method may be completed by hardware integrated logic circuits in the processor 610 or instructions in the form of software. The foregoing processor 610 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of this disclosure. The general-purpose processor may be a microprocessor, or the processor may be any conventional processor or the like. The steps of the method disclosed with reference to the embodiments of this disclosure may be directly executed and completed by a hardware decoding processor, or executed and completed by a combination of hardware and software modules in a decoding processor.

The software module may be located in a computer-readable storage medium mature in the art, such as a random access memory, a flash memory, a read-only memory, a programmable read-only memory or electrically erasable programmable memory, or a register. The computer-readable storage medium is located in the memory 620, and the processor 610 fetches information in the memory 620, and completes the steps of the foregoing method in combination with its hardware. Specifically, the computer-readable storage medium stores a computer program, where when the computer program is executed by the processor 610, the steps of the method embodiments described above with reference to FIG. 1 and FIG. 3 are implemented.

It can be understood that the embodiments described in the embodiments of this disclosure may be implemented by hardware, software, firmware, middleware, microcode, or a combination thereof. For hardware implementation, a processing module may be implemented in one or more application-specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented inside the processor or outside the processor.

An embodiment of this disclosure further provides a computer-readable storage medium, where the computer-readable storage medium stores a computer program. When the computer program is executed by a processor, the processes of the foregoing method embodiments are implemented, with the same technical effects achieved. To avoid repetition, details are not described herein again. For example, the computer-readable storage medium is a read-only memory (ROM), a random access memory (RAM), a magnetic disk, an optical disc, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, however, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A resource allocation method, applied to a terminal device in sidelink communication, comprising:
   determining a first numerical value of a first counter at a first occasion; wherein the first occasion comprises at least one of:
   a time of arrival of a data packet,
   a receiving occasion of higher layer signaling, Downlink Control Information (DCI), or Sidelink Control Information (SCI) when the terminal device is a transmit-end terminal device,
   an occasion indicated by higher layer signaling, DCI or SCI when the terminal device is a transmit-end terminal device,
   a receiving occasion of higher layer signaling, DCI, SCI, a Scheduling Request (SR), or a Buffer Status Report (BSR), when the terminal device is a receive-end terminal device, or
   an occasion indicated by higher layer signaling, DCI, SCI, SR or BSR when the terminal device is a receive-end terminal device;
   in response to that the first numerical value is greater than a first preset value, determining an occupancy status of a first transmission resource associated with the first occasion, wherein the first preset value is an integer greater than or equal to 0; and
   selecting a target resource for information transmission based on the occupancy status of the first transmission resource;
   in response to that the first numerical value is less than or equal to the first preset value, selecting the first transmission resource as the target resource;
   wherein the selecting a target resource for information transmission based on the occupancy status of the first transmission resource comprises:
   in response to that the first transmission resource is not occupied, adjusting the first numerical value to obtain a second numerical value, wherein the second numerical value is less than the first numerical value; and
   selecting the target resource for information transmission based on the second numerical value;
   wherein the selecting a target resource for information transmission based on the second numerical value comprises:
   in response to that the second numerical value is less than or equal to the first preset value, selecting the first available transmission resource that is after the first occasion in time domain as the target resource for information transmission, wherein the first available transmission resource that is after the first occasion in time domain is a resource that meets at least one of the following conditions: unoccupied, satisfying interference requirements, or satisfying a quality of service (QOS) demand; or in response to that the second numerical value is greater than the first preset value, selecting the target resource for information transmission based on an occupancy status of a second transmission resource associated with a second occasion, wherein a time gap between the second occasion and the first occasion is a target duration, and the target duration is any one of the following: a time domain resource unit granularity, a time domain detection granularity, a network-configured duration, and a terminal-configured duration;

wherein the first transmission resource and the second transmission resource are resources transmitted in sidelink communication.

2. The method according to claim 1, wherein the determining an occupancy status of a first transmission resource associated with the first occasion comprises at least one of the following manners:

determining the occupancy status of the first transmission resource based on a transmission resource indicated by scheduling assignment (SA) information, wherein the SA is used to schedule the first transmission resource;

determining the occupancy status of the first transmission resource based on an interference measurement value and an interference threshold corresponding to the first transmission resource;

determining the occupancy status of the first transmission resource based on a signal strength value and a signal strength threshold corresponding to the first transmission resource;

determining the occupancy status of the first transmission resource based on an interference measurement value and an interference threshold corresponding to a transmission resource in which the SA is located; or determining the occupancy status of the first transmission resource based on a signal strength value and a signal strength threshold corresponding to a transmission resource in which the SA is located.

3. The method according to claim 1, wherein the determining an occupancy status of a first transmission resource associated with the first occasion comprises:

determining the occupancy status of the first transmission resource associated with the first occasion per the time domain detection granularity, wherein the time domain detection granularity is the same as or different from the time domain resource unit granularity.

4. The method according to claim 1, wherein a location of an available frequency domain resource in the first available transmission resource that is after the first occasion in time domain is determined in one of the following manners:

determined based on the second numerical value and the total number of sub-channels in the first available transmission resource that is after the first occasion in time domain; and determined based on an identifier of a terminal device or a geographical location of a terminal device.

5. The method according to claim 1, further comprising:

transmitting first target information on the target resource, wherein the first target information comprises one of the following information: control information and data information, control information, and initial transmission information.

6. The method according to claim 5, wherein the first target information comprises control information, and the method further comprises:

determining a third numerical value of a second counter at a third occasion; and in response to that the third numerical value is less than or equal to a second preset value, transmitting second target information on a third transmission resource associated with the third occasion or on the first available transmission resource that is after the third occasion in time domain, wherein the second target information comprises data information and control information, or the second target information comprises data information, and the second preset value is an integer greater than or equal to 0; or, in response to that the third numerical value is greater than the second preset value, determining an occupancy status of the third transmission resource;

in response to that the third transmission resource is not occupied, adjusting the third numerical value to obtain a fourth numerical value, wherein the fourth numerical value is less than the third numerical value;

in response to that the fourth numerical value is less than or equal to the second preset value, transmitting the second target information on the first available transmission resource that is after the third occasion in time domain; and in response to that the fourth numerical value is greater than the second preset value, selecting a resource for transmitting the second target information based on an occupancy status of a fourth transmission resource associated with a fourth occasion, wherein a time gap between the fourth occasion and the third occasion is the time domain resource unit granularity;

or, wherein the first target information comprises initial transmission information, and the method further comprises:

determining a fifth numerical value of a third counter at a fifth occasion;

in response to that the fifth numerical value is greater than a third preset value, determining an occupancy status of a fifth transmission resource associated with the fifth occasion, wherein the third preset value is an integer greater than or equal to 0;

in response to that the fifth transmission resource is not occupied, adjusting the fifth numerical value to obtain a sixth numerical value, wherein the sixth numerical value is less than the fifth numerical value;

in response to that the sixth numerical value is less than or equal to the third preset value, transmitting retransmission information of the initial transmission information on the first available transmission resource that is after the fifth occasion in time domain; and in response to that the sixth numerical value is greater than the third preset value, selecting a resource for transmitting the retransmission information of the initial transmission information based on an occupancy status of a sixth transmission resource associated with a sixth occasion, wherein a time gap between the sixth occasion and the fifth occasion is the time domain resource unit granularity.

7. The method according to claim 6, wherein the first counter and the second counter are activated in one of the following manners:

both are activated simultaneously at a first target occasion;

the first counter is activated at the first target occasion, and the second counter is activated when a value of the first counter is less than or equal to the first preset value; and the first counter is activated at the first target occasion, and the second counter is activated when a terminal device transmits the second target information on the target resource; wherein the first target occasion is earlier than the first occasion and the third occasion, and the first target occasion is one of the following occasions: time of arrival of a data packet, a receiving occasion of third target information, and an occasion indicated by the third target information;

when the terminal device is a transmit-end terminal device, the third target information comprises at least one of the following information: higher layer signaling, downlink control information DCI, or sidelink control information SCI; or when the terminal device is a receive-end terminal device, the third target information comprises at least one of the following information: higher layer signaling, DCI, a scheduling request SR, a buffer status report BSR, or SCI.

8. The method according to claim 7, wherein the first counter and the second counter are simultaneously activated at the first target occasion, and an initial value of the second counter is greater than or equal to an initial value of the first counter;

or, wherein the first counter and the second counter are simultaneously activated at the first target occasion, and in response to that an occasion at which the fourth numerical value is less than or equal to the second preset value is earlier than an occasion at which the second numerical value is less than or equal to the first preset value, the first available transmission resource that is after the third occasion in time domain is the same as the first available transmission resource that is after the first occasion in time domain, or the first available transmission resource that is after the third occasion in time domain is an available transmission resource next to the first available transmission resource that is after the first occasion in time domain.

9. A terminal device, applied to sidelink communication, comprising: a memory, a processor, and a computer program stored in the memory and capable of running on the processor, wherein when the computer program is executed by the processor, following steps are implemented:

determining a first numerical value of a first counter at a first occasion; wherein the first occasion comprises at least one of:

a time of arrival of a data packet, a receiving occasion of higher layer signaling, Downlink Control Information (DCI), or Sidelink Control Information (SCI) when the terminal device is a transmit-end terminal device, an occasion indicated by higher layer signaling, DCI or SCI when the terminal device is a transmit-end terminal device, a receiving occasion of higher layer signaling, DCI, SCI, a Scheduling Request (SR), or a Buffer Status Report (BSR), when the terminal device is a receive-end terminal device, or an occasion indicated by higher layer signaling, DCI, SCI, SR or BSR when the terminal device is a receive-end terminal device;

in response to that the first numerical value is greater than a first preset value, determining an occupancy status of a first transmission resource associated with the first occasion, wherein the first preset value is an integer greater than or equal to 0; and selecting a target resource for information transmission based on the occupancy status of the first transmission resource;

in response to that the first numerical value is less than or equal to the first preset value, selecting the first transmission resource as the target resource;

wherein the selecting a target resource for information transmission based on the occupancy status of the first transmission resource comprises:

in response to that the first transmission resource is not occupied, adjusting the first numerical value to obtain a second numerical value, wherein the second numerical value is less than the first numerical value; and selecting the target resource for information transmission based on the second numerical value;

wherein the selecting a target resource for information transmission based on the second numerical value comprises:

in response to that the second numerical value is less than or equal to the first preset value, selecting the first available transmission resource that is after the first occasion in time domain as the target resource for information transmission, wherein the first available transmission resource that is after the first occasion in time domain is a resource that meets at least one of the following conditions: unoccupied, satisfying interference requirements, or satisfying a quality of service (QOS) demand; or in response to that the second numerical value is greater than the first preset value, selecting the target resource for information transmission based on an occupancy status of a second transmission resource associated with a second occasion, wherein a time gap between the second occasion and the first occasion is a target duration, and the target duration is any one of the following: a time domain resource unit granularity, a time domain detection granularity, a network-configured duration, and a terminal-configured duration;

wherein the first transmission resource and the second transmission resource are resources transmitted in sidelink communication.

10. The terminal device according to claim 9, wherein when the computer program is executed by the processor, following steps are further implemented:

transmitting first target information on the target resource, wherein the first target information comprises one of the following information: control information and data information, control information, and initial transmission information.

11. The terminal device according to claim 10, wherein the first target information comprises control information; the computer program, when executed by the processor, causes the processor to perform:

determining a third numerical value of a second counter at a third occasion; and in response to that the third numerical value is less than or equal to a second preset value, transmitting second target information on a third transmission resource associated with the third occasion or on the first available transmission resource that is after the third occasion in time domain, wherein the second target information comprises data information and control information, or the second target information comprises data information, and the second preset value is an integer greater than or equal to 0; or, in response to that the third numerical value is greater than the second preset value, determining an occupancy status of the third transmission resource;

in response to that the third transmission resource is not occupied, adjusting the third numerical value to obtain a fourth numerical value, wherein the fourth numerical value is less than the third numerical value;

in response to that the fourth numerical value is less than or equal to the second preset value, transmitting the second target information on the first available transmission resource that is after the third occasion in time domain; and in response to that the fourth numerical value is greater than the second preset value, selecting a resource for transmitting the second target information based on an occupancy status of a fourth transmission resource associated with a fourth occasion, wherein a time gap between the fourth occasion and the third occasion is the time domain resource unit granularity;

or, wherein the first target information comprises initial transmission information, and the computer program, when executed by the processor, causes the processor to perform:

determining a fifth numerical value of a third counter at a fifth occasion;

in response to that the fifth numerical value is greater than a third preset value, determining an occupancy status of a fifth transmission resource associated with the fifth occasion, wherein the third preset value is an integer greater than or equal to 0;

in response to that the fifth transmission resource is not occupied, adjusting the fifth numerical value to obtain a sixth numerical value, wherein the sixth numerical value is less than the fifth numerical value;

in response to that the sixth numerical value is less than or equal to the third preset value, transmitting retransmission information of the initial transmission information on the first available transmission resource that is after the fifth occasion in time domain; and in response to that the sixth numerical value is greater than the third preset value, selecting a resource for transmitting the retransmission information of the initial transmission information based on an occupancy status of a sixth transmission resource associated with a sixth occasion, wherein a time gap between the sixth occasion and the fifth occasion is the time domain resource unit granularity.

12. The terminal device according to claim 11, wherein the first counter and the second counter are activated in one of the following manners:

both are activated simultaneously at a first target occasion;

the first counter is activated at the first target occasion, and the second counter is activated when a value of the first counter is less than or equal to the first preset value; and the first counter is activated at the first target occasion, and the second counter is activated when a terminal device transmits the second target information on the target resource; wherein the first target occasion is earlier than the first occasion and the third occasion, and the first target occasion is one of the following occasions: time of arrival of a data packet, a receiving occasion of third target information, and an occasion indicated by the third target information;

when the terminal device is a transmit-end terminal device, the third target information comprises at least one of the following information: higher layer signaling, downlink control information DCI, or sidelink control information SCI; or when the terminal device is a receive-end terminal device, the third target information comprises at least one of the following information: higher layer signaling, DCI, a scheduling request SR, a buffer status report BSR, or SCI.

13. The terminal device according to claim 12, wherein the first counter and the second counter are simultaneously activated at the first target occasion, and an initial value of the second counter is greater than or equal to an initial value of the first counter;

or, wherein the first counter and the second counter are simultaneously activated at the first target occasion, and in response to that an occasion at which the fourth numerical value is less than or equal to the second preset value is earlier than an occasion at which the second numerical value is less than or equal to the first preset value, the first available transmission resource that is after the third occasion in time domain is the same as the first available transmission resource that is after the first occasion in time domain, or the first available transmission resource that is after the third occasion in time domain is an available transmission resource next to the first available transmission resource that is after the first occasion in time domain.

14. The terminal device according to claim 9, wherein when determining an occupancy status of a first transmission resource associated with the first occasion, the computer program, when executed by the processor, causes the processor to perform at least one of the following manners:

determining the occupancy status of the first transmission resource based on a transmission resource indicated by scheduling assignment (SA) information, wherein the SA is used to schedule the first transmission resource;

determining the occupancy status of the first transmission resource based on an interference measurement value and an interference threshold corresponding to the first transmission resource;

determining the occupancy status of the first transmission resource based on a signal strength value and a signal strength threshold corresponding to the first transmission resource;

determining the occupancy status of the first transmission resource based on an interference measurement value and an interference threshold corresponding to a transmission resource in which the SA is located; or determining the occupancy status of the first transmission resource based on a signal strength value and a signal strength threshold corresponding to a transmission resource in which the SA is located.

* * * * *